(12) United States Patent
Peluso et al.

(10) Patent No.: US 9,747,097 B2
(45) Date of Patent: Aug. 29, 2017

(54) DEVICES, SYSTEMS AND METHODS FOR SEGMENTED DEVICE BEHAVIOR

(71) Applicant: QARDIO, INC., Walnut, CA (US)

(72) Inventors: Marco Peluso, London (GB); Rosario Iannella, Amsterdam (NL)

(73) Assignee: QARDIO, INC., Walnut, CA (US)

( * ) Notice: Subject to any disclaimer, the term of this patent is extended or adjusted under 35 U.S.C. 154(b) by 0 days.

(21) Appl. No.: 14/869,098

(22) Filed: Sep. 29, 2015

(65) Prior Publication Data

US 2016/0092199 A1 Mar. 31, 2016

Related U.S. Application Data

(60) Provisional application No. 62/057,924, filed on Sep. 30, 2014.

(51) Int. Cl.
G06F 9/445 (2006.01)
H04L 29/08 (2006.01)

(52) U.S. Cl.
CPC .......... *G06F 8/65* (2013.01); *G06F 8/61* (2013.01); *G06F 9/44505* (2013.01); *H04L 67/34* (2013.01)

(58) Field of Classification Search
CPC .............. G06F 8/65; G06F 8/61; H04L 67/34
USPC ......................................................... 717/171
See application file for complete search history.

(56) References Cited

U.S. PATENT DOCUMENTS

| | | | | |
|---|---|---|---|---|
| 6,944,859 | B2 * | 9/2005 | Bunger | G06F 8/61 707/999.001 |
| 7,482,908 | B2 | 1/2009 | Kean et al. | |
| 8,855,562 | B2 | 10/2014 | Rajaraman et al. | |
| 9,414,219 | B2 * | 8/2016 | Shao | H04W 8/18 |
| 2004/0154014 | A1 * | 8/2004 | Bunger | G06F 8/61 717/174 |
| 2005/0034115 | A1 * | 2/2005 | Carter | G06F 8/64 717/173 |
| 2005/0154787 | A1 | 7/2005 | Cochran et al. | |
| 2006/0143135 | A1 * | 6/2006 | Tucker | G06F 21/121 705/59 |
| 2006/0160529 | A1 * | 7/2006 | Glass | G06F 8/61 455/418 |
| 2007/0277029 | A1 * | 11/2007 | Rao | G06F 8/61 713/2 |
| 2008/0141244 | A1 | 6/2008 | Kelley | |
| 2010/0251231 | A1 | 9/2010 | Coussemaeker et al. | |
| 2011/0078044 | A1 * | 3/2011 | Fernandez Gutierrez | G06Q 30/0185 705/26.41 |
| 2012/0005325 | A1 * | 1/2012 | Kanodia | G06F 8/61 709/223 |

(Continued)

FOREIGN PATENT DOCUMENTS

| | | |
|---|---|---|
| KR | 1020100113415 A | 10/2010 |
| KR | 1020130022533 A | 3/2013 |
| WO | 2016054175 A1 | 4/2016 |

*Primary Examiner* — John Chavis

(74) *Attorney, Agent, or Firm* — Shartsis Friese LLP; Cecily Anne O'Regan

(57) ABSTRACT

Device segmentation systems and methods enable devices to be manufactured and placed into the stream of commerce without customization for a particular retailer. The customization occurs at a later point in time when the device is activated after sale. This allows devices to be transferred among retailers without the additional expense of re-customizing the device.

24 Claims, 5 Drawing Sheets

(56) References Cited

U.S. PATENT DOCUMENTS

| | | | |
|---|---|---|---|
| 2013/0031225 A1* | 1/2013 | Evans | H04L 67/36 709/221 |
| 2013/0109323 A1 | 5/2013 | Ruutu et al. | |
| 2014/0335833 A1* | 11/2014 | Woloshyn | G06F 3/0488 455/412.2 |
| 2015/0089091 A1 | 3/2015 | Tucker | |
| 2015/0128185 A1* | 5/2015 | Chakravarty | H04L 67/30 725/46 |
| 2015/0242912 A1* | 8/2015 | Depoy | G06F 8/60 705/26.35 |
| 2015/0264108 A1* | 9/2015 | Ji | G06F 17/30899 709/219 |
| 2016/0054988 A1* | 2/2016 | Desire | G05B 19/04 717/177 |
| 2016/0147546 A1* | 5/2016 | Chao | G06F 21/30 726/18 |
| 2016/0259491 A1* | 9/2016 | Jacobs | H04L 67/34 |

* cited by examiner

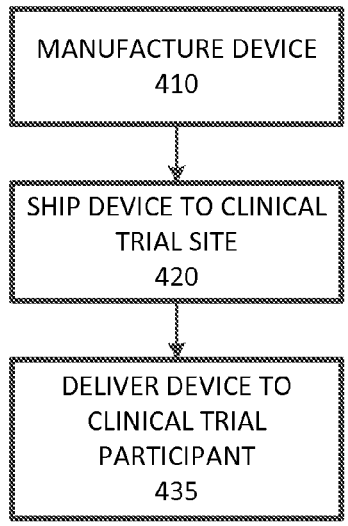
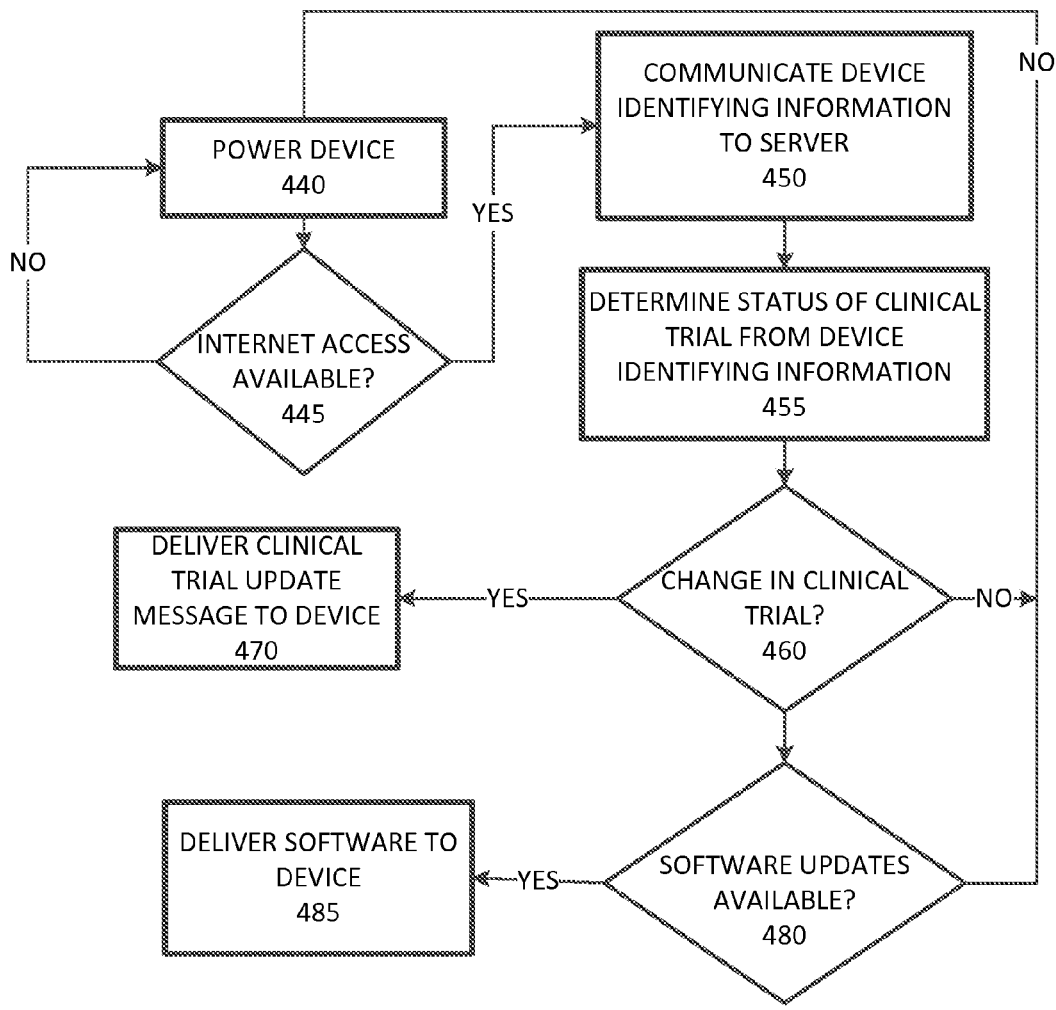
FIG. 4A
FIG. 4B

DEVICES, SYSTEMS AND METHODS FOR SEGMENTED DEVICE BEHAVIOR

CROSS-REFERENCE

This application claims the benefit of U.S. Provisional Application No. 62/057,924, filed Sep. 30, 2014, entitled Segmented Device Behavior which application is incorporated herein by reference.

BACKGROUND

Personalization of an experience for consumer electronic devices can be valuable to the end-user and a key differentiator in the marketplace. One type of personalization involves transferring a user's personal data from one device to another before the user begins using the new device. In another example, mobile phones are typically sold with the phone carrier's personalized software preloaded by the manufacturer in order to adapt the user's experience. This approach can be effective, but is also costly as it requires the cost of preloading personalized software as well as managing separate inventory SKUs ("Stock Keeping Unit") for each personalized version of a given device.

Previous concepts are disclosed in U.S. Pat. No. 7,482,908 B2 to Kean et al. for Radio-Frequency-Device Personalization; US 2015/0089091 A1 to Tucker for Personalization of Devices While Packaged; U.S. Pat. No. 8,855,562 B2 to Rajaraman, et al. for Method and System for Enabling Discovery of Services and Automated Exchange of Data Between Bluetooth Devices; US 2013/0109323 A1 to Ruutu et al. for Wirelessly Transferring Data to a Packaged Electronic Device.

What is needed is systems and methods for personalizing a device without the costly preloading of personalized software and SKU management.

SUMMARY

Disclosed is a system whereby a device's personalization in its behavior, user interface or messaging (including, for example, promotional messaging) by way of customized software and/or customized product features and/or customized content (text, images, audio, or video), is managed by the retailer or the manufacturer of the electronic device in coordination with a centralized system that is configurable to push (or from which the device can pull) software, data, graphics, text, music, etc. to achieve a personalized or user segmented behavior. Device communications with a centralized system can be ongoing, take place at designated time intervals, or depend on the occurrence of one or more designated actions by a user or occurrence of certain events. Additionally the customization can be managed by the manufacturer or retailer based on an association of the end retailer and an ID of the electronic device.

An aspect of the disclosure is directed to a method for automated exchange of customization software between an electronic device having internet access and one or more remote computing systems. As will be appreciated by those skilled in the art in addition to delivering customization software, systems and methods can deliver a feature and/or content using the same methods without departing from the scope of the disclosure. Suitable methods comprise: powering the electronic device; determining, via the electronic device, availability of internet access; automatically communicating from the electronic device an electronic device ID to the one or more remote computing systems; automatically determining whether customization software is available for installation on the electronic device; and if customization software is available, receiving the customization software from the one or more remote computing systems without user interaction, wherein the customization software is selected and delivered based on an association of the electronic device ID with at least one of a retailer ID and a software ID at the one or more remote computing systems. Additionally, the methods can include determining from the one or more remote computing systems a status of the electronic device. Once the status is determined, the method can include one or more of displaying a message on a display of the electronic device, delivering a message to an audio component of the electronic device, providing information from a sensor to the one or more remote computing systems, deactivating the electronic device, and providing a GPS location (or other information deriving from sensors on or in communication, such as proximal device communication, with the device that is relevant to the customization) for the electronic device to a third party. As will be appreciated by those skilled in the art, displaying can include playing or reproducing a message which includes or comprises a video or audio. Additionally, methods can include installing the customization software on the electronic device, receiving customization software to the electronic device is a push from the one or more remote computing systems to the electronic device, and/or receiving customization software to the electronic device is a pull from the one or more remote computing systems by the electronic device. Customization software or software updates can be received by the electronic device or delivered by the one or more remote computing systems. In still other configurations, the delivery can be a combination of push and pull. Further steps can include determining whether customization software is installed on the electronic device; and if customization software is installed, automatically determining whether an update is available for the customization software. Delivering updates to the customization software from the one or more remote computing systems can also be performed without user interaction. Additionally, information can be received from the electronic device at a third party server.

Another aspect of the disclosure is directed to a machine readable medium containing instructions that, when executed by an electronic device, cause the electronic device to perform a method. The method performed comprises: powering the electronic device; determining, via the electronic device, availability of internet access; automatically communicating from the electronic device an electronic device ID to one or more remote computing systems; automatically determining whether customization software is available for installation on the electronic device; and if customization software is available, receiving the customization software from the one or more remote computing systems without user interaction, wherein the customization software is selected and delivered based on an association of the electronic device ID with at least one of a retailer ID and a software ID at the one or more remote computing systems. Additionally, the methods can include determining from the one or more remote computing systems a status of the electronic device. Once the status is determined, the method can include one or more of displaying a message on a display of the electronic device, delivering a message to an audio component of the electronic device, providing information from a sensor to the one or more remote computing systems, deactivating the electronic device, and providing a GPS location (or other information deriving from sensors on or in communication, such as proximal device communication, with the device that is relevant to the customization) for the electronic device to a third party. As will be appreciated by those skilled in the art, displaying can include playing or reproducing a message which includes or comprises a video or audio. Additionally, methods can include installing the customization software on the electronic device, receiving customization software to the electronic device is a push from the one or more remote computing systems to the electronic device, and/or receiving customization software to the electronic device is a pull from the one or more remote computing systems by the electronic device. Further steps can include determining whether customization software is installed on the electronic device; and if customization software is installed, automatically determining whether an update is available for the customization software. Delivering updates to the customization software from the one or more remote computing systems can also be performed without user interaction. Additionally, information can be received from the electronic device at a third party server.

Still another aspect of the disclosure is directed to a system for automated exchange of customization software. Suitable systems comprise: an electronic device having internet access wherein the electronic device has an electronic device program storing electronic device code implementable by an electronic device processor, the electronic device code comprising code to deliver a device ID; and one or more remote computing systems, wherein the one or more remote computing systems has a remote computing system program storing remote computing system code implementable by the remote computing system processor, the remote computing system code comprising code to receive the electronic device ID from the electronic device, code to determine whether customization software is available for installation on the electronic device, and if customization software is available, code to deliver the customization software from the remote computing system without user interaction, wherein the customization software is selected and delivered based on an association of the electronic device ID with at least one of a retailer ID and a software ID at the one or more remote computing systems. Systems can also comprise code to determine from the one or more remote computing systems a status of the electronic device. In some system configurations, code for displaying a message on a screen of the electronic device, deactivating the electronic device, and providing a GPS location (or other information deriving from sensors on or in communication, such as proximal device communication, with the device that is relevant to the customization) for the electronic device to a third party is also provided. As will be appreciated by those skilled in the art, displaying can include playing or reproducing a message which includes or comprises a video or audio. Additionally, code for automatically determining whether customization software is installed on the electronic device can be provided; and if customization software is installed, code for automatically determining whether an update is available for the customization software. In some configurations, code for delivering the update to the customization software from the one or more remote computing systems without user interaction is provided.

Yet another aspect of the disclosure is directed to a machine readable means containing instructions that, when executed by an electronic device means, cause the electronic device means to perform a method. The method performed comprises: powering the electronic device means; determining, via the electronic device means, availability of internet access; automatically communicating from the electronic device means an electronic device ID to one or more remote computing systems means; automatically determining whether customization software is available for installation on the electronic device means; and if customization software is available, receiving the customization software from the one or more remote computing systems means without user interaction, wherein the customization software is received based on an association of the electronic device ID with at least one of a retailer ID and a software ID at the one or more remote computing systems means. Additionally, the instructions can cause the electronic device means to determine from the one or more remote computing systems means a status of the electronic device means. In at least some configurations, the instructions can cause the electronic device means to one or more of displaying a message on a display means of the electronic device means, delivering a message to an audio component of the electronic device, providing information from a sensor to the one or more remote computing systems, deactivating the electronic device means, and providing a GPS location (or other information deriving from sensors on or in communication, such as proximal device communication, with the device that is relevant to the customization) for the electronic device means to a third party. As will be appreciated by those skilled in the art, in addition to displaying the devices and system can play or reproduce a message which includes or comprises a video and/or audio.

The instructions can also cause installation of the customization software on the electronic device means in at least some configurations. The step of receiving customization software to the electronic device means is a push from the one or more remote computing systems means to the electronic device means; while in others it is a pull from the one or more remote computing systems means by the electronic device means. In still other configurations, the delivery can be a combination of push and pull. In at least some configurations, the instructions automatically determining whether customization software is installed on the electronic device; and if customization software is installed, automatically determining whether an update is available for the customization software. The step of receiving the update to the customization software from the one or more remote computing systems can occur without user interaction. Additionally, information from the electronic device can be received at a third party server in some configurations.

Still another aspect of the disclosure is directed to a method for automated exchange of customization software between an electronic device having internet access and one or more remote computing systems, the method comprising: powering the electronic device; determining, via the electronic device, availability of internet access; automatically communicating from the electronic device an electronic device ID to the one or more remote computing systems; automatically determining whether content is available for delivery to the electronic device; and if content is available, receiving the content from the remote computing system without user interaction, wherein the content is selected and delivered based on an association of the electronic device ID with at least one of a retailer ID and a software ID at the one or more remote computing systems.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4A is a flow diagram illustrating how a manufactured device moves within a clinical trial ecosystem; and FIG. 4B is a flow diagram that illustrates how the device, once delivered to a final participant interacts with a central system for customization and clinical trial management and compliance.

DETAILED DESCRIPTION

A centralized system, such as a server, is configurable to track individual computing devices (e.g., cell phones, blood pressure monitors, glucose monitors, music players, laptops, etc.) by way of one or more uniquely identifying codes or serial numbers assigned to each of the devices in the centralized system at the time of manufacture or at some point in the supply chain before distribution. The centralized system is configurable to assign each of the devices to different groups with different customization characteristics based on one or more pieces of unique information identifying each device.

Figure 1:
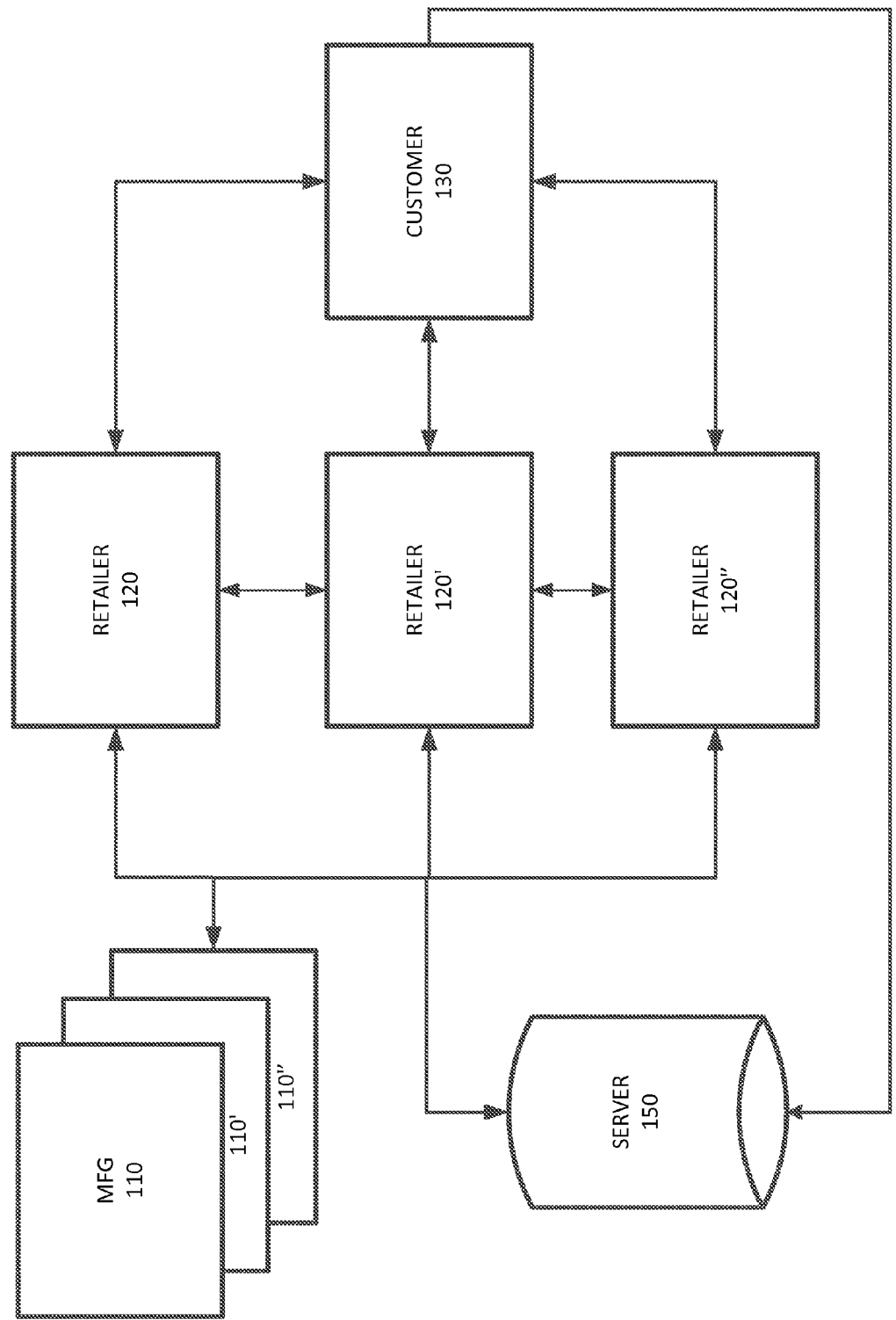
FIG. 1 is a block diagram illustrating an interrelationship between one or more manufacturers, one or more retailers, a customer and a server.

FIG. 1 is a block diagram illustrating an interrelationship between one or more manufacturers 110, 110', 110", one or more retailers 120, 120', 120", a customer 130 and a server 150. One or more manufacturers 110, 110', 110" can be a source for a manufactured electronic good, such as a cell phone, a computer, a blood pressure monitor, a heart rate monitor, etc. Each of the one or more manufacturers 110, 110', 110" can supply manufactured products to one or more retailers 120, 120', 120". As will be appreciated by those skilled in the art, additional intermediaries may exist in the relationship without departing from the scope of the disclosure. A first party, such as the one or more manufacturers 110, 110', 110", applies a unique identified to each of the manufactured products. Retailer specific software customizing the electronic device for a particular retailer is not installed on the electronic device by the manufacturer prior to delivering the electronic device into the supply chain. The identified electronic devices are then sent to one or more second parties, such as retailers 120, 120', 120". Retailers can include, for example, AT&T store, Apple Store, Amazon.com, etc. The retailer then sells an individual electronic device to a customer 130. One customer can purchase one or more devices configurable under this system from one or more retailers. As will be appreciated by those skilled in the art, the devices can be sent from the one or more manufacturers 110, 110', 110" to an intermediary before final delivery to the retailer 120, without departing from the scope of the disclosure.

Once the device is acquired by the customer, the customer activates the electronic device which automatically contacts one or more remote servers, illustrated as server 150. The server 150 can be under the control of one of the retailers, one of the manufacturers, an intermediary (not shown), or a combination thereof.

As will be appreciated by those skilled in the art, by not installing the retailer specific customized software at the time of manufacture and prior to placing the electronic device into the stream of commerce, the electronic device can easily be transferred among retailers, e.g. when a first retailer has excess stock that it then makes available to another retailer or wholesaler; or when a first retailer returns surplus stock to a manufacturer who then sends the surplus stock to a second retailer without further handling (i.e., no need to update software prior to sending to a new retailer).

The system is also configurable to leverage an association of user accounts to one or more uniquely identifying codes or pieces of information to extend one or more of each of customization and/or segmentation of the user experience, electronic device behavior, user interface and/or messaging to a user (including, for example, promotional messaging), beyond the immediate and direct interaction with the electronic device (e.g. personalized email messaging). Where a location of the end user changes (e.g. updated address, out of town travel), the system can factor that information into the evaluation of information to be provided to the end user when the device is powered on.

Figure 2:
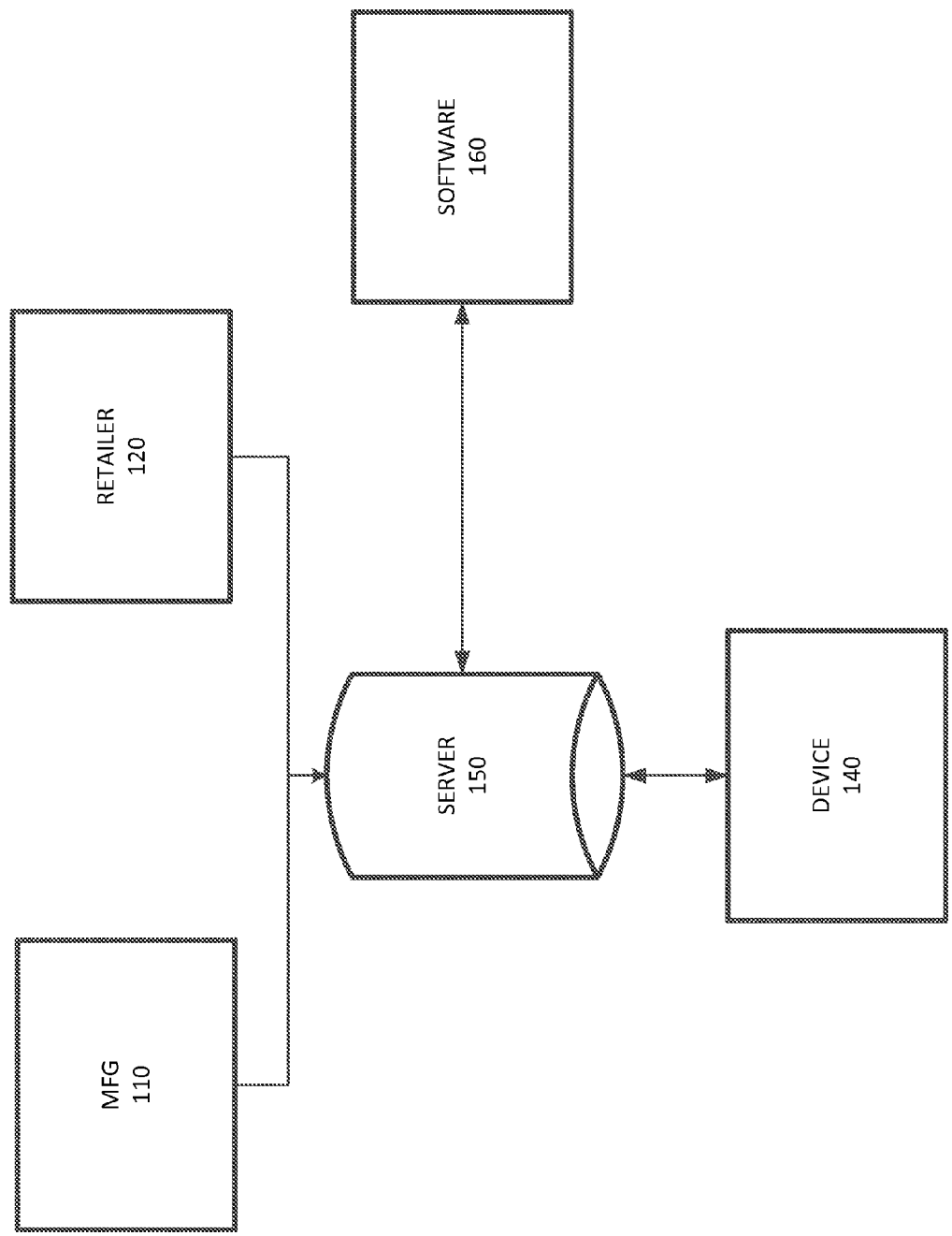
FIG. 2 is a flow diagram illustrating an exemplar association of device to software.

In one configuration the server 150 is configurable to determine upon activation, which manufacturer 110 and/or which retailer 120 are currently associated with a particular electronic device 140 and to either automatically push electronic device specific software 160, or software updates, or allow a pull of electronic device specific software or software updates. Additionally, the system is configurable to provide other user features or user messaging content. Updates to electronic device software can also be handled in the same manner. See, FIG. 2.

TABLE 1

| Manufacturer | Retailer | Device ID | Software | Content/Messaging |
|---|---|---|---|---|
| A | 1 | A100 | SA100 | CA100 |
| A | 1 | A101 | SA100 | CA100 |
| A | 2 | A200 | SA200 | CA200 |
| A | 2 | A201 | SA200 | CA200 |
| B | 1 | B100 | SB100 | CBA100 |
| B | 1 | B101 | SB100 | CB100 |
| B | 2 | B200 | SB200 | CB200 |
| B | 2 | B201 | SB200 | CB200 |
| C | 1 | C100 | SC100 | CC100 |
| C | 1 | C101 | SC100 | CC100 |
| C | 2 | C200 | SC200 | CC200 |
| C | 2 | C201 | SC200 | CC200 |

A device ID is associated with an electronic device produced by Manufacturer A, provided to Retailer 1, upon activation, the system would know, based on the device ID to install Software SA100. If Device ID A100 were transferred to Retailer 2, that device would no longer be associated with Retailer 1 and would become associated with Retailer 2, at which point the system would then install software associated with Retailer 2, such as Software SA200. Additional content or messaging can be provided as well.

As will be appreciated by those skilled in the art, as a device ID is associated with an electronic device produced by Manufacturer A, provided to Retailer 1, upon activation, the system could also tailor software that is pushed to the electronic device or pulled from the electronic device from one or both of the retailer and the manufacturer, without departing from the scope of the disclosure.

Figure 3A:
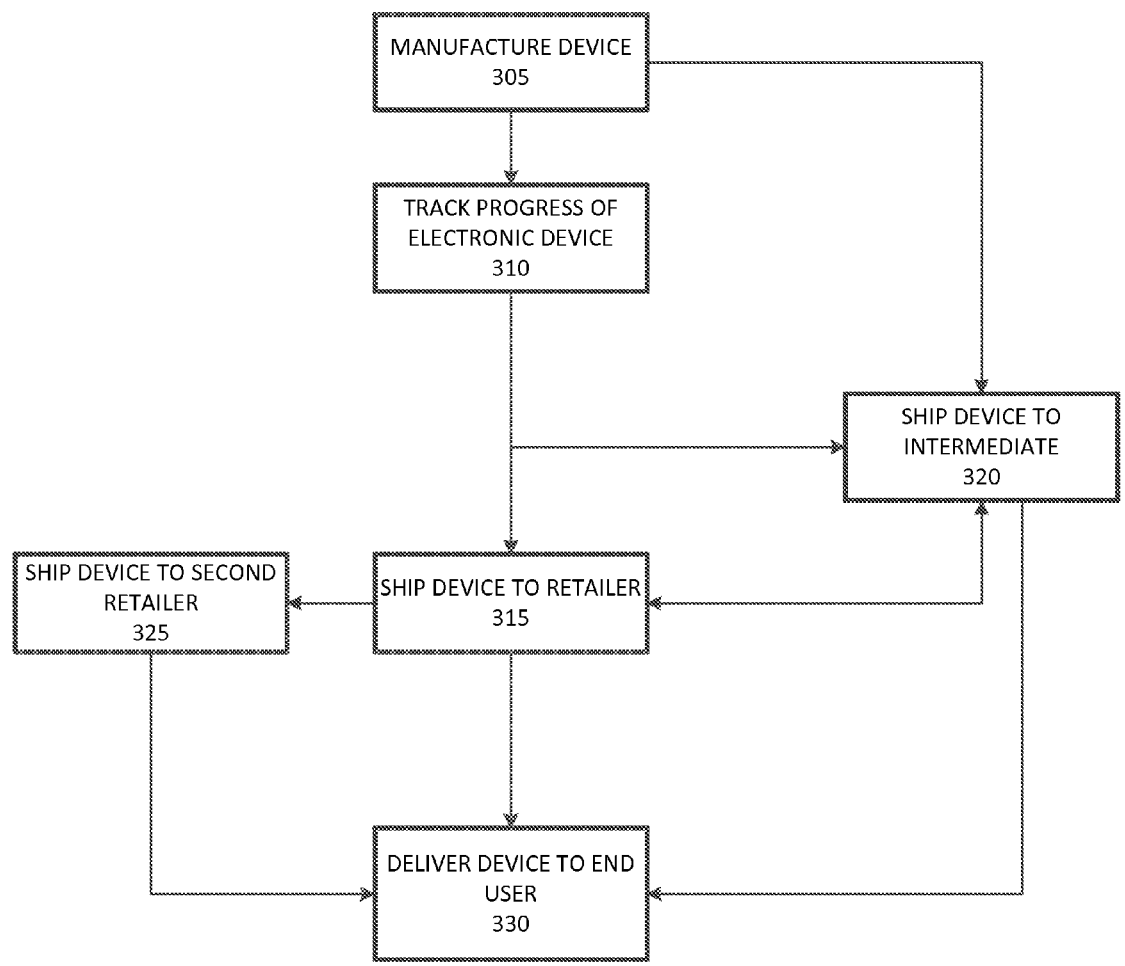
FIG. 3A is a flow diagram illustrating how a manufactured device moves within the selling ecosystem.

In one configuration of the system as shown in FIG. 3A, at the time of manufacturing the electronic device is programmed with a uniquely identifying code or serial number 305. A centralized system is configurable to track the progress 310 of the electronic device by way of such uniquely identifying code or serial number throughout the manufacturing chain, quality testing, shipping and supply chain (referred collectively as "device tracking"). The centralized system records which electronic devices are shipped to which market, retailer or sold or otherwise shipped under which promotional or distribution program. The device can be shipped to a retailer 315 and then returned to the manufacturer; shipped to an intermediate 320 and then shipped to an a retailer 315 or shipped from the first retailer 315 to a second retailer 325 before delivering to an end user 330. In at least one configuration, once the device is sold, the retailer transmits the sold status to the manufacturer for annotation into the system. Alternatively, if the device is transferred to a different retailer (or a retailer in another geographic area), the retailer (or the recipient retailer) can notify the manufacturer at which point the software code associated with the device would be updated.

Figure 3B:
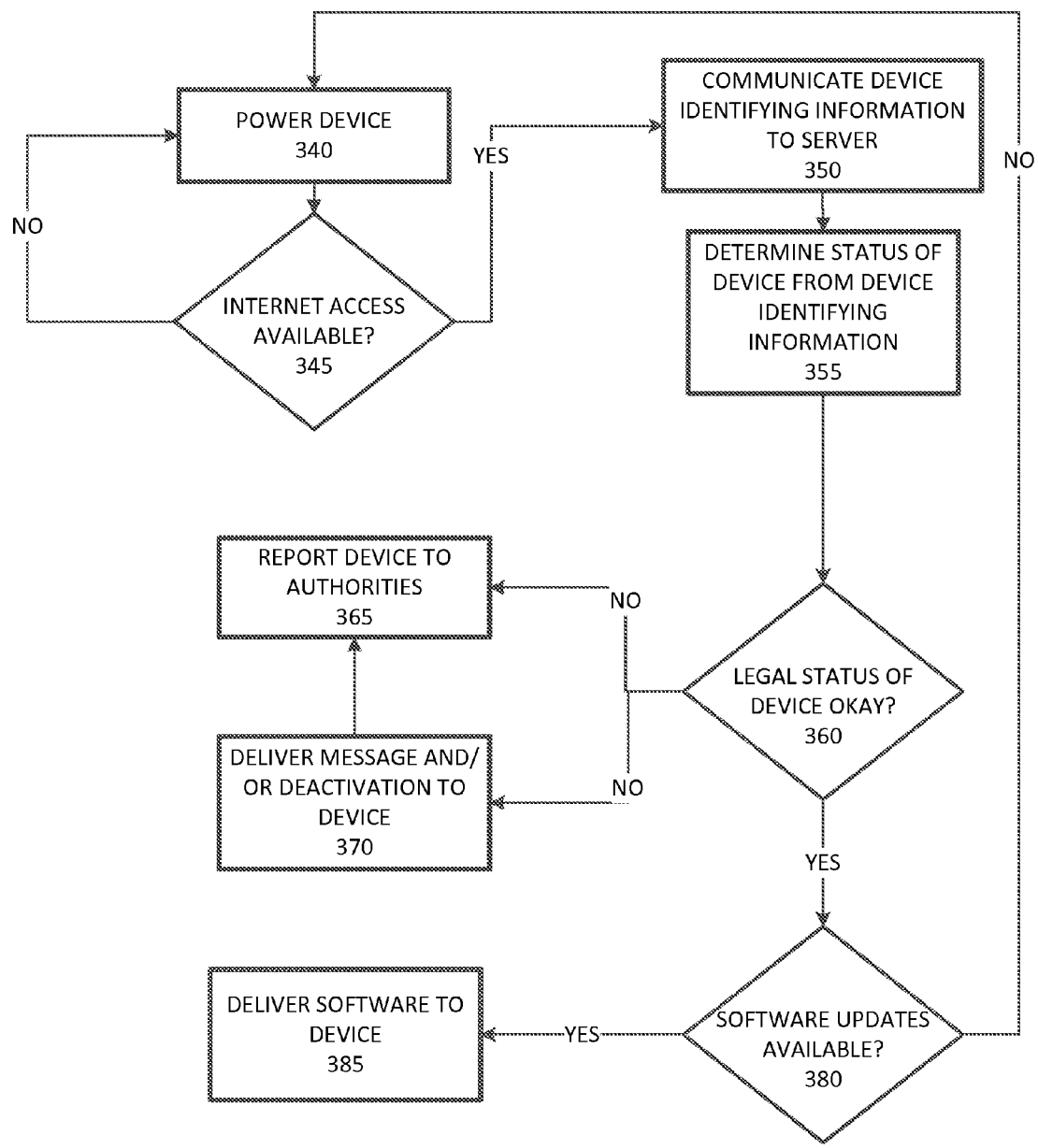
FIG. 3B is a flow diagram that illustrates how the device, once delivered to a final location interacts with a central system for customization.

Turning to FIG. 3B, when an end user activates or powers on the electronic device 340 directly (if it is an electronic device directly connected to the Internet, like a smartphone or a consumer home internet router), or indirectly (for example if the electronic device is a wireless blood pressure monitor that operates with an Internet capable electronic device such as a smartphone), the electronic device determines whether internet access is available 345. If internet access is not available, the electronic device can periodically check for access, or wait until the next time the device is powered on to query for access. Once internet access is established, the device's uniquely identifying code or serial number is automatically transmitted to the centralized system 350. Once the one or more pieces of identifying information is received, the central system automatically determines the status of the device 355 to determine the legal status of the device 360. If the status of the device is okay, then centralized system automatically annotates that the device has been activated upon a first communication from the electronic device and determines if software updates are available 380. If the system determines that software updates or information is available, then the system automatically transmits software to the device 385. Data as well as graphical, or textual or other types of assets can be delivered to the electronic device itself and/or to any other accessory devices to achieve a customized or segmented behavior. If the legal status of the device is not okay, e.g., the device has been reported stolen or recalled by the manufacturer, then the system can automatically report the device to the appropriate authorities 365 and/or automatically deliver a message to the device for display on a screen and/or automatically deactivate the device 370. As will be appreciated by those skilled in the art, displaying can include playing or reproducing a message which includes or comprises a video or audio.

As shown in FIG. 4A where the device is part of a clinical trial, the manufacturer manufactures the device 410, and ships the device to the clinical trial site 420. Thereafter, the device is delivered to the clinical trial participant 435. As with the prior discussion, the device can be delivered between clinical trial sites without returning the device to the manufacturer. Once the device is powered on 440, the device determines if internet access is available 445. If internet access is available, then the device automatically communicates device identifying information to a system server 450. The system server automatically notes that the device is being activated and determines the status of the clinical trial and clinical trial device from the device identifying information 455. Thereafter, the system automatically determines if there has been a change in the clinical trial 460. If there has not been a change in the clinical trial, then no action related to the clinical trial need be taken. If there has been a change in the clinical trial, then a clinical trial update message is automatically delivered to the device 470. In some configurations, the message can continue to be presented until such time as the user acknowledges and dismisses the message. In other configurations, the message can time out and/or be replaced by an updated message at a later time. Additionally, the system can determine whether software updates are available for the device. If no updates are available then no action is taken. If updates are available, the software is delivered to the device 485.

EXAMPLES

As will be appreciated by those skilled in the art, the disclosure is directed to more than simply a software platform. The disclosure teaches a new process of automatically segmenting device behavior which is cost effective and efficient and which is unable to be replicated cost effectively and efficiently via a manual process. The system, in response to communication of device identifying information, can automatically deliver information and software to the device. The practical application of the disclosed system for segmented device behavior can be appreciated more fully from the following examples:

A. Electronic Device (e.g. Blood Pressure Monitor) Sold by Chain Store to User

Blood pressure monitor is manufactured in a first country different than the country where the blood pressure monitor will be purchased, e.g., manufactured abroad and imported and sold in the United States and forwarded to a store of a retail pharmacy chain. A User purchases the blood pressure monitor and activates the blood pressure monitor for the first time, e.g. with a smart phone or via a suitable web interface. The blood pressure monitor determines whether an internet connection is available. If an internet connection is available, the blood pressure monitor then automatically communicates device identifying information with a centralized computing system. The centralized computing system then records the blood pressure monitor as activated, and transmits the customized information relative to the retail pharmacy chain, to the blood pressure monitor, and the smartphone (if appropriate). The user can then be offered the opportunity to share blood pressure readings from the blood pressure monitor with, for example, the retail pharmacy chain from which the blood pressure monitor was purchased, a health care provider, or another person. Additionally, the user can receive personalized marketing communications (e.g., emails, message or other text/image/audio/video content displayed or delivered directly or via the device or other devices tethered or wirelessly connected to the device) and visualization of information of the blood pressure smartphone app that are related to the retail pharmacy chain from which the blood pressure monitor was purchased.

B. Electronic Device (e.g. Blood Pressure Monitor) Sold to Retailer Reported as Stolen Blood pressure monitor is manufactured in the United States and forwarded on to ABC Retailer. Shipment with blood pressure monitor to ABC Retailer is reported as stolen. When units assigned to the shipment identified as stolen are activated, the blood pressure monitor determines whether an internet connection is available. If an internet connection is available, the blood pressure monitor communicates device identifying information to the central system. Upon receipt of the device identifying information for the stolen device, the centralized system can for example, transmit a customized messaging informing the user of each unit about the theft, and/or deactivate the unit permanently. Alternatively or additionally, in case of a market recall in response to a system malfunction, the system can inform the retailer, manufacturer or the appropriate regulatory authorities and, where GPS is activated, provide the last known location of the electronic device for a more timely response.

C. Electronic Device (e.g. Blood Pressure Monitor) Used for Clinical Study

Blood pressure monitor is provided to a user participating in Big Clinical Study (the participant) made by ABC Pharma Company. When Big Clinical Study participant activates blood pressure monitor for the first time, the blood pressure monitor determines whether an internet connection is available. If an internet connection is available, the blood pressure monitor then automatically communicates device identifying information with a centralized computing system and the centralized system records the blood pressure monitor as active, and transmits customized information relative to the Big Clinical Study to the participant's blood pressure monitor and/or associated device (e.g. smart phone), possibly including specific settings for the blood pressure monitor, and provides the participant with instructions and information specific to the Big Clinical Study. The use of the devices and systems enables establishing customized behavior while preserving the "blind" (or "blindness") character of the allocation of clinical trial participants to different groups and sub-groups (e.g., experimental group vs. control group) of the trial.

The systems and methods according to aspects of the disclosed subject matter may utilize a variety of computer systems, communications devices, networks and/or digital/logic devices for operation. Each may in turn utilize a suitable computing device, which can be manufactured with, loaded with and/or fetch from some storage device, and then execute, instructions that cause the computing device to perform a method according to aspects of the disclosed subject matter. A computing device can include without limitation a mobile user device such as a smart watch, a mobile phone, a smart phone and a cellular phone, a personal digital assistant ("PDA"), such as a Android® or iPhone®, a tablet, a laptop and the like. In at least some configurations, a user can execute a browser application over a network, such as the Internet, to view and interact with digital content, such as screen displays. Access could be over or partially over other forms of computing and/or communications networks. A user may access a web-browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method. The user's computing device may be part of a network of computing devices and the methods of the disclosed subject matter may be performed by different computing devices, perhaps in different physical locations, cooperating or otherwise interacting to perform a disclosed method. For example, a user's portable computing device may run an app alone or in conjunction with a remote computing device, such as a server on the Internet. As will be appreciated by those skilled in the art, "computing device" includes any and all of the above discussed logic circuitry, communications devices and digital processing capabilities or combinations of these.

Certain embodiments of the disclosed subject matter may be described for illustrative purposes as steps of a method which may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

A machine readable medium is also disclosed storing instructions that, when executed by a computing device, can cause the computing device to perform a method, according to the disclosure contained herein.

The instructions may be stored on a suitable "machine readable medium" within a computing device or in communication with or otherwise accessible to the computing device. As used in the present application a machine readable medium includes a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a random access memory (RAM), a read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software can constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for automated exchange of customization software between an electronic device having internet access and one or more remote computing systems, the method comprising:
   delivering the electronic device without a retailer specific software installed;
   powering the electronic device;
   determining, via the electronic device, availability of internet access;
   determining from the one or more remote computing systems a status of the electronic device;
   automatically communicating from the electronic device an electronic device ID to the one or more remote computing systems;
   automatically determining whether retailer specific software is available for installation on the electronic device, and if retailer specific software is available, receiving the retailer specific software from the remote computing system without user interaction, wherein the retailer specific software is selected and delivered based on an association of the electronic device ID with at least one of a retailer ID and a software ID at the one or more remote computing systems; and
   one or more of displaying a message on a display of the electronic device, delivering a message to an audio component of the electronic device, providing information from a sensor to the one or more remote computing systems, deactivating the electronic device, and providing a GPS location or other sensor information for the electronic device to a third party.

2. The method of claim 1 further comprising installing the retailer specific software on the electronic device.

3. The method of claim 1 wherein the step of receiving retailer specific software to the electronic device is a push from the one or more remote computing systems to the electronic device.

4. The method of claim 1 wherein the step of receiving retailer specific software to the electronic device is a pull from the one or more remote computing systems by the electronic device.

5. The method of claim 1 further comprising receiving information from the electronic device at a third party server.

6. A method for automated exchange of customization software between an electronic device having internet access and one or more remote computing systems, the method comprising:
   delivering the electronic device without a retailer specific software installed;
   powering the electronic device;
   determining, via the electronic device, availability of internet access;
   determining from the one or more remote computing systems a status of the electronic device;
   automatically communicating from the electronic device an electronic device ID to the one or more remote computing systems;
   determining whether retailer specific software is installed on the electronic device; and if retailer specific software is installed, automatically determining whether an update is available for the retailer specific software;
   receiving the retailer specific software update from the remote computing system without user interaction, wherein the retailer specific software update is selected and delivered based on an association of the electronic device ID with at least one of a retailer ID and a software ID at the one or more remote computing systems.

7. The method of claim 6 further comprising the step of delivering the update to the retailer specific software from the remote computing system without user interaction.

8. A machine readable medium containing instructions that, when executed by an electronic device, cause the electronic device to perform a method, the method comprising:
   delivering the electronic device without a retailer specific software installed;
   powering the electronic device;
   determining, via the electronic device, availability of internet access;
   determining from the one or more remote computing systems a status of the electronic device;
   automatically communicating from the electronic device an electronic device ID to one or more remote computing systems;
   automatically determining whether retailer specific software is available for installation on the electronic device, and if retailer specific software is available, receiving the customization software from the one or more remote computing systems without user interaction, wherein the retailer specific software is selected and delivered based on an association of the electronic device ID with at least one of a retailer ID and a software ID at the remote computing system; and
   one or more of displaying a message on a screen of the electronic device, delivering a message to an audio component of the electronic device, providing information from a sensor to the one or more remote computing systems, deactivating the electronic device, and providing a GPS location or other sensor information for the electronic device to a third party.

9. The machine readable medium containing instructions that, when executed by the electronic device, cause the electronic device to perform the method of claim 8 further comprising installing the retailer specific software on the electronic device.

10. The machine readable medium containing instructions that, when executed by the electronic device, cause the electronic device to perform the method of claim 8 wherein the step of receiving customization software to the electronic device is a push from the one or more remote computing systems to the electronic device.

11. The machine readable medium containing instructions that, when executed by the electronic device, cause the electronic device to perform the method of claim 8 wherein the step of receiving retailer specific software to the electronic device is a pull from the one or more remote computing systems by the electronic device.

12. The machine readable medium containing instructions that, when executed by the electronic device, cause the electronic device to perform the method of claim 9 further comprising sending information from the electronic device at a third party server.

13. A machine readable medium containing instructions that, when executed by an electronic device, cause the electronic device to perform a method, the method comprising:
   delivering the electronic device without a retailer specific software installed;
   powering the electronic device;
   determining, via the electronic device, availability of internet access;
   determining from the one or more remote computing systems a status of the electronic device;
   automatically communicating from the electronic device an electronic device ID to one or more remote computing systems;
   automatically determining whether retailer specific software is installed on the electronic device; and if retailer specific software is installed, automatically determining whether an update is available for the retailer specific software;
   receiving the retailer specific software update from the remote computing system without user interaction, wherein the retailer specific software update is selected and delivered based on an association of the electronic device ID with at least one of a retailer ID and a software ID at the one or more remote computing systems.

14. The machine readable medium containing instructions that, when executed by the electronic device, cause the electronic device to perform the method of claim 13 further comprising the step of receiving the update to the retailer specific software from the one or more remote computing systems without user interaction.

15. A system for automated exchange of customization software, the system comprising:
   an electronic device having internet access wherein the electronic device is delivered without a retailer specific software and has an electronic device program storing electronic device code implementable by an electronic device processor, the electronic device code comprising
      code to deliver a device ID; and
   one or more remote computing systems, wherein the one or more remote computing systems has a remote computing system program storing remote computing system code implementable by the remote computing system processor, the remote computing system code comprising
      code to receive the electronic device ID from the electronic device,
      code to determine whether retailer specific software is available for installation on the electronic device, and
      if retailer specific software is available, code to deliver the customization software from the one or more remote computing systems without user interaction, wherein the retailer specific software is selected and delivered based on an association of the electronic device ID with at least one of a retailer ID and a software ID at the one or more remote computing systems
      code to determine from the one or more remote computing systems a status of the electronic device, and
      code for displaying a message on a screen of the electronic device, delivering a message to an audio component of the electronic device, providing information from a sensor to the one or more remote computing systems, deactivating the electronic device, and providing a GPS location or other sensor information for the electronic device to a third party.

16. The system of claim 15 further comprising code for automatically determining whether retailer specific software is installed on the electronic device; and if retailer specific software is installed, code for automatically determining whether an update is available for the customization software.

17. The system of claim 16 further comprising code for delivering the update to the retailer specific software from the one or more remote computing systems without user interaction.

18. A machine readable medium means containing instructions that, when executed by an electronic device means, cause the electronic device means to perform a method, the method comprising:
   delivering the electronic device without a retailer specific software installed;
   powering the electronic device means;
   determining, via the electronic device means, availability of internet access;
   determining from the one or more remote computing systems means a status of the electronic device means;
   automatically communicating from the electronic device means an electronic device ID to one or more remote computing systems means;
   automatically determining whether retailer specific software is available for installation on the electronic device means, and if retailer specific software is available, receiving the customization software from the one or more remote computing systems means without user interaction, wherein the retailer specific software is received based on an association of the electronic device ID with at least one of a retailer ID and a software ID at the remote computing system means; and
   one or more of displaying a message on a display means of the electronic device means, delivering a message to an audio component means of the electronic device means, providing information from a sensor means to the one or more remote computing systems means, deactivating the electronic device means, and providing a GPS location or other sensor information means for the electronic device means to a third party.

19. The machine readable medium containing instructions that, when executed by the electronic device means, cause the electronic device means to perform the method of claim 18 further comprising installing the retailer specific software on the electronic device means.

20. The machine readable medium means containing instructions that, when executed by the electronic device means, cause the electronic device means to perform the method of claim 18 wherein the step of receiving retailer specific software to the electronic device means is a push from the one or more remote computing systems means to the electronic device means.

21. The machine readable medium means containing instructions that, when executed by the electronic device means, cause the electronic device means to perform the method of claim 18 wherein the step of receiving retailer specific software to the electronic device means is a pull from the one or more remote computing systems means by the electronic device means.

22. The machine readable medium containing instructions that, when executed by a computing device, cause the computing device to perform the method of claim 18 further comprising receiving information from the electronic device at a third party server.

23. A machine readable medium means containing instructions that, when executed by an electronic device means, cause the electronic device means to perform a method, the method comprising:

delivering the electronic device without a retailer specific software installed;

powering the electronic device means;

determining, via the electronic device means, availability of internet access;

determining from the one or more remote computing systems means a status of the electronic device means;

automatically communicating from the electronic device means an electronic device ID to one or more remote computing systems means;

determining whether retailer specific software is installed on the electronic device; and if retailer specific software is installed, automatically determining whether an update is available for the retailer specific software, and if retailer specific software update is available, receiving the software update from the one or more remote computing systems means without user interaction, wherein the retailer specific software is received based on an association of the electronic device ID with at least one of a retailer ID and a software ID at the remote computing system means.

24. The machine readable medium containing instructions that, when executed by a computing device, cause the computing device to perform the method of claim 23 further comprising the step of receiving the update to the retailer specific software from the one or more remote computing systems without user interaction.

* * * * *